(12) United States Patent
Alameh et al.

(10) Patent No.: US 10,284,708 B2
(45) Date of Patent: *May 7, 2019

(54) PORTABLE ELECTRONIC DEVICE WITH DUAL, DIAGONAL PROXIMITY SENSORS AND MODE SWITCHING FUNCTIONALITY

(71) Applicant: Motorola Mobility LLC, Chicago, IL (US)

(72) Inventors: Rachid M Alameh, Crystal Lake, IL (US); Patrick J Cauwels, South Beloit, IL (US); Paul Steuer, Hawthorn Woods, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/425,871

(22) Filed: Feb. 6, 2017

(65) Prior Publication Data
US 2017/0149957 A1    May 25, 2017

Related U.S. Application Data

(63) Continuation of application No. 14/595,261, filed on Jan. 13, 2015.

(51) Int. Cl.
*H04M 1/725*    (2006.01)
*H04W 52/02*    (2009.01)

(52) U.S. Cl.
CPC ... *H04M 1/72569* (2013.01); *H04W 52/0254* (2013.01); *H04M 2250/12* (2013.01);
(Continued)

(58) Field of Classification Search
CPC ......... H04M 1/72569; H04M 2250/12; H04W 52/0254; Y02B 60/50
See application file for complete search history.

(56) References Cited

U.S. PATENT DOCUMENTS 7,714,265 B2 * 5/2010 Fadell .................. G01J 1/4204
250/201.1
2003/0051182 A1  3/2003 Tsirkel et al.
(Continued)

FOREIGN PATENT DOCUMENTS

EP    1868107    12/2007
WO    2015/138095    9/2015

OTHER PUBLICATIONS

Ballard, Tristan, "Exam Report", Great Britain Application No. GB1600453.3; dated Jun. 28, 2016.
(Continued)

*Primary Examiner* — Ryan W Sherwin
(74) *Attorney, Agent, or Firm* — Philip H. Burnus, IV

(57) ABSTRACT

An electronic device includes a housing, a user interface, and one or more processors operable with the user interface. At least one proximity sensor component is operable with the one or more processors and can include an infrared signal receiver to receive an infrared emission from an object external to the housing. The one or more processors can be operable to actuate one or more user interface devices when the infrared signal receiver receives the infrared emission from an object external to the housing. The actuation can be a function of distance, in accordance with a prioritization, or combinations thereof.

18 Claims, 9 Drawing Sheets

(52) U.S. Cl.
CPC .......... *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/22* (2018.01)

(56) References Cited

U.S. PATENT DOCUMENTS

| | | |
|---|---|---|
| 2008/0185485 A1 | 8/2008 | Watanabe |
| 2008/0218493 A1 | 9/2008 | Patten et al. |
| 2010/0007518 A1* | 1/2010 | Kang .................. G06F 3/017 340/12.22 |
| 2012/0243091 A1 | 9/2012 | Amm et al. |
| 2014/0075230 A1* | 3/2014 | Suggs .................. H02J 7/35 713/323 |
| 2014/0368855 A1 | 12/2014 | Yamano |
| 2016/0202114 A1* | 7/2016 | Alameh ............... G01J 1/0233 250/339.02 |
| 2016/0203709 A1* | 7/2016 | Alameh ............... G08C 19/16 340/12.1 |
| 2016/0205236 A1* | 7/2016 | Alameh ........... H04W 52/0254 455/566 |

OTHER PUBLICATIONS

Sherwin, Ryan, "Final Office Action", U.S. Appl. No. 14/595,261, filed Jan. 13, 2015; dated May 31, 2017.

Sherwin, Ryan, "NonFinal OA", U.S. Appl. No. 14/595,261, filed Jan. 13, 2015; dated Nov. 17, 2016.

Sherwin, Ryan W., "NonFinal OA", U.S. Appl. No. 14/595,261, filed Jan. 13, 2015; dated Sep. 7, 2017.

\* cited by examiner

PORTABLE ELECTRONIC DEVICE WITH DUAL, DIAGONAL PROXIMITY SENSORS AND MODE SWITCHING FUNCTIONALITY

CROSS REFERENCE TO PRIOR APPLICATIONS

This application is a continuation application claiming priority and benefit under 35 USC § 120 from U.S. application Ser. No. 14/595,261, filed Jan. 13, 2015, which is incorporated by reference for all purposes.

BACKGROUND

Technical Field

This disclosure relates generally to electronic devices, and more particularly to portable electronic devices having proximity sensors.

Background Art

Proximity sensors detect the presence of nearby objects before those objects contact the device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor. Electronic devices employ such proximity sensors to manage audio and video device output.

For example, when a device determines that a user's face is proximately located with the device, the device may reduce speaker volume so as not to over stimulate the user's eardrums. As another example, the proximity sensor may turn off the device display when the device is positioned near the user's ear to save power. Thus, these types of wireless communication device dynamically adjust the operation of audio and video output components when these components are positioned very close to, i.e., adjacent to, a user's ear. To work properly, the transmitter emitting the electromagnetic or electrostatic field in these proximity sensors draws power and must be continually operational, which can lead to reduced run time. It would be advantageous to have an improved proximity sensor systems and new uses for the same.

Figure 1:
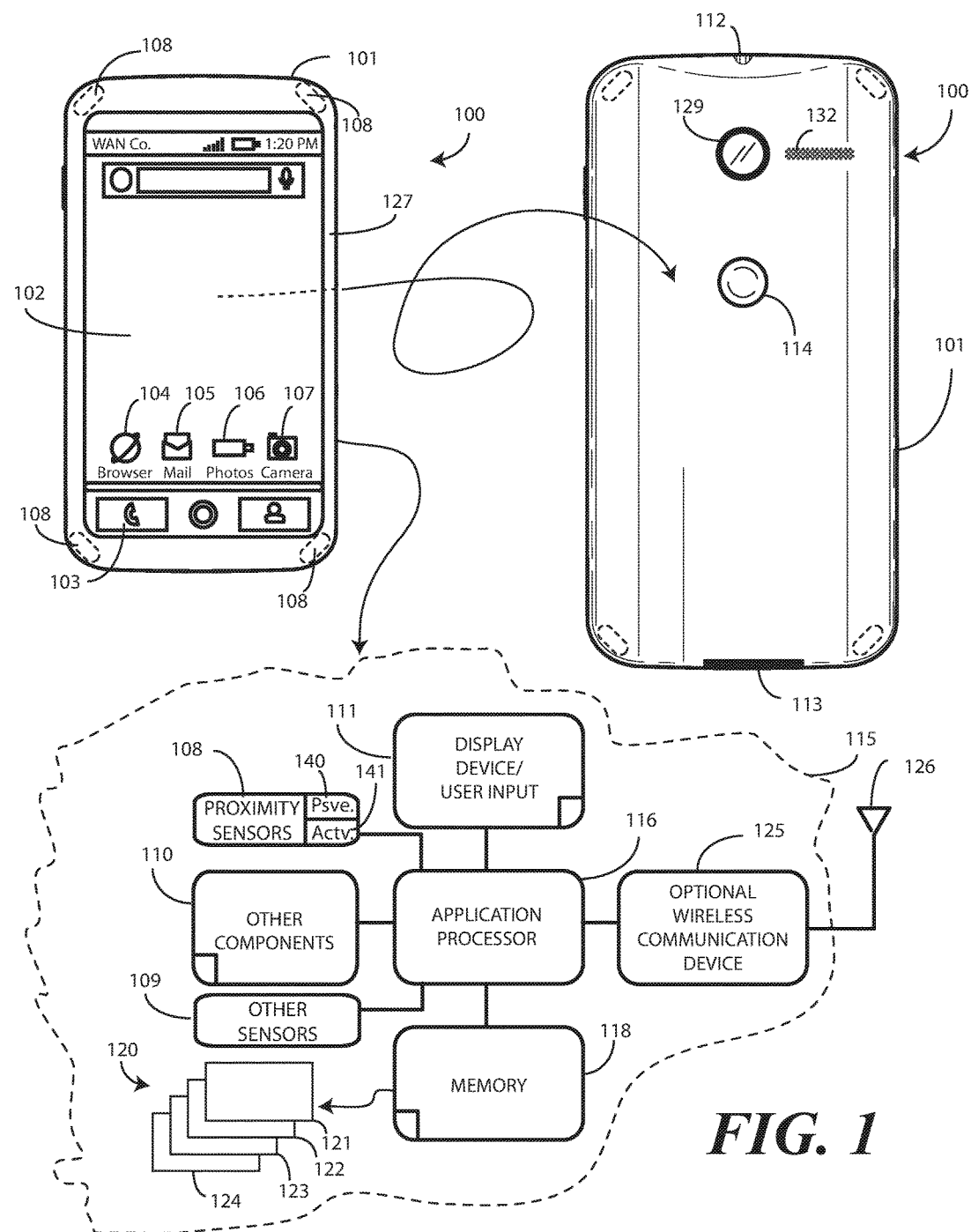
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to control modes of operation of an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling proximity sensors to control device operation as described herein. The non-processor circuits may include, but are not limited to, a radio receiver, a radio transmitter, signal drivers, clock circuits, power source circuits, and user input devices. As such, these functions may be interpreted as steps of a method to perform device control in response to one or more proximity sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device, which may be portable in one or more embodiments, having a housing. The housing can include a front major face, a rear major face, a first side edge, and a second side edge. In one embodiment, a display or other user interface component is disposed along the front major face. One or more processors can be operable with the display or user interface.

In one embodiment, the electronic device has at least one proximity sensor component that is operable with the one or more processors. In one embodiment, the at least one proximity sensor component comprises a receiver only, and does not include a corresponding transmitter. In some embodiments described below, the electronic device can also include one or more proximity detector components comprising transmitter-receiver pairs. However, as used herein, a proximity sensor component comprises a receiver only that does not include a corresponding transmitter.

Illustrating by example, in one embodiment the proximity sensor component comprises a signal receiver to receive signals from objects external to the housing of the electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component.

Accordingly, the one or more processors may be in a low power or sleep mode when no user is near the electronic device. During this time, the at least one proximity sensor component, which consumes very little power in one or more embodiments, can be active. When a user comes within reception range of the at least one proximity sensor component, infrared emissions from the user are detected by the at least one proximity sensor component. The one or more processors can then actuate one or more user interface devices when the infrared signal receiver receives the infrared emission from the user to "wake" the device. Accordingly, the device will be ready to use once the user reaches the device without requiring additional user operations to bring the device out of the low power or sleep mode.

A simple use case is helpful in demonstrating how one or more embodiments of the disclosure can be used. When a user is away from an electronic device and not within a detection range, components other than the proximity sensor component and its associated detection circuitry can be placed in a low power or sleep mode to conserve power. In one or more embodiments, the proximity sensor component and its associated circuitry is the only sensor device that remains active to monitor a 360-degree coverage area across a range of about ten feet from the electronic device. In one embodiment, the proximity sensor component only consumes on the order of five microamps in this mode.

When a person comes within the detection radius of the device, the at least one proximity sensor component receives an infrared emission from the person's body heat. When this occurs, the at least one proximity sensor component can wake the one or more processors, which can then actuate one or more user interface devices. For example, in one embodiment a motion detector and a microphone can be actuated in anticipation of next actions the user may take, such as talking or touching the device following presence detection. In another embodiment, where the detection range is set so as to be within a visible distance from a display or other user interface, the one or more processors can actuate the display or user interface in addition to the microphone and motion detector. If the detection range is far from the electronic device where the display is not visible to the user, the one or more processors may initially keep the display OFF, turning it on as the infrared emissions become stronger as the user comes closer to the device. These use cases are merely examples illustrating how embodiments of the disclosure can be used. Others will be readily obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are show disposed on the rear major face of the electronic device 100 in this embodiment. In this illustrative embodiment, a user interface component 114, which may be a button or touch sensitive surface, can also be disposed along the rear-housing member 128.

In one embodiment, the electronic device 100 includes one or more connectors 112,113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, one or more proximity sensors 108 can be operable with the one or more processors 116. In one embodiment, the one or more proximity sensors 108 include one or more proximity sensor components 140. The proximity sensors 108 can optionally include one or more proximity detector components 141. In one embodiment, the proximity sensor components 140 comprise only signal receivers. By contrast, the proximity detector components 141 include a signal receiver and a corresponding signal transmitter. While each proximity detector component can be any one of various types of proximity sensors, such as but not limited to, capacitive, magnetic, inductive, optical/photoelectric, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat emanating from a person's body while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 140 comprises an infrared signal receiver so as to be able to detect infrared emissions from a person. Accordingly, the proximity sensor component 140 requires no transmitter since objects disposed external to the housing deliver emissions that are received by the infrared receiver. As no transmitter is required, each proximity sensor component 140 can operate at a very low power level. Simulations show that a group of infrared signal receivers can operate with a total current drain of just a few microamps. By contrast, a proximity detector component 141, which includes a signal transmitter, may draw hundreds of microamps to a few milliamps.

Figure 2:
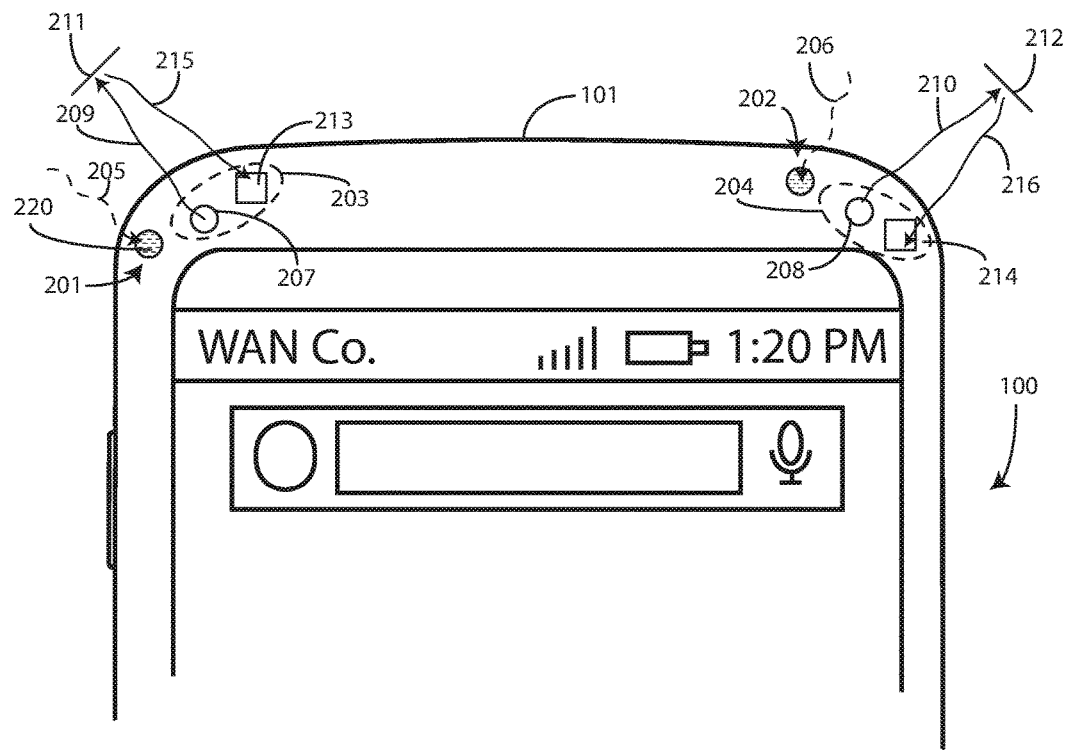
FIG. 2 illustrates explanatory proximity sensor component configurations in accordance with one or more embodiments of the disclosure.

Turning briefly to FIG. 2, illustrated therein are two proximity sensor components 201,202 and two proximity detector components 204, each disposed at a corner of the electronic device 100. In this embodiment, each proximity sensor component 201,202 comprises a signal receiver 220, such as an infrared photodiode to detect an infrared emission 205,206 from an object external to the housing 101 of the electronic device 100. No corresponding transmitter is included or required for the proximity sensor component 201,202 to function. As no active transmitter emitting signals is included, each proximity sensor component 201,202 is sometimes referred to as a "passive" proximity sensor.

By contrast, each proximity detector component 203,204 can be an infrared proximity sensor set that uses a signal emitter 207,208 that transmits a beam 209,210 of infrared light that reflects 211,212 from a nearby object and is received by a corresponding signal receiver 213,214. Proximity detector components 203,204 can be used, for example, to compute the distance to any nearby object from characteristics associated with the reflected signals 215,216. The reflected signals 215,216 are detected by the corresponding signal receiver 213,214, which may be an infrared photodiode used to detect reflected light emitting diode (LED) light, respond to modulated infrared signals, and/or perform triangulation of received infrared signals.

Figure 3:
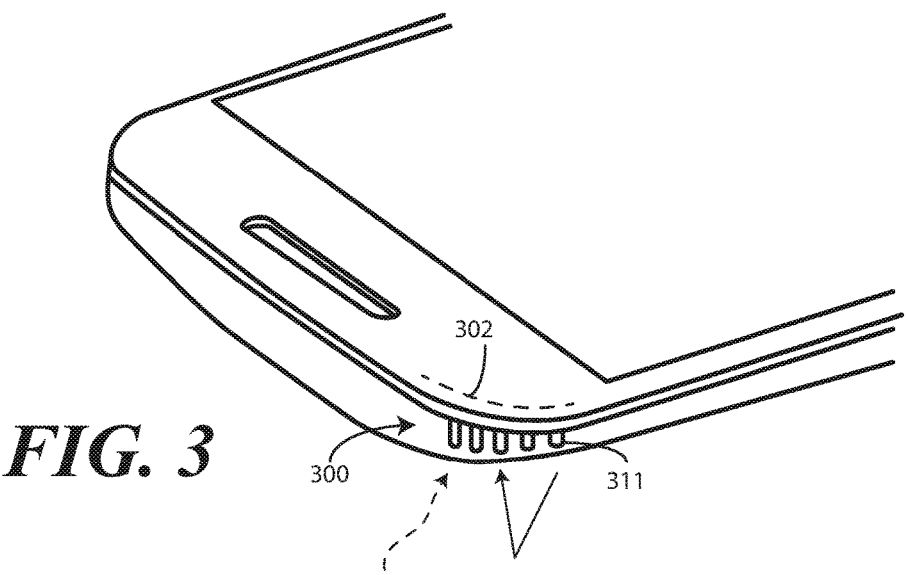
FIG. 3 illustrates one explanatory proximity sensor component configuration in accordance with one or more embodiment of the disclosure.

In one embodiment, the proximity sensor components 201,202, and where optionally included the proximity detector components 203,204, can include at least two sets of components. For example, a first set of components can be disposed at a first corner of the electronic device 100, while another set of components can be disposed at a second corner of the electronic device 100. As shown in FIG. 3, when the components are disposed at a corner 300 of the electronic device, the components can be disposed behind a grille 301 that defines one or more apertures through which infrared emissions are received and optionally transmitted.

In one embodiment, the grille 301 can define one or more reception beams in which infrared emissions can be received. The definition of such reception beams can enable the proximity sensor components (201,202) to detect motion by determining along which reception beams each emission is received. The proximity sensor components (201,202) can also detect changes across reception beams to detect motion as well.

The use of the grille 301 can also allow components to be collocated as well. For example, in one embodiment both a proximity sensor component (201) and a proximity detector component (203) can be disposed behind a common grille 301, with the one or more apertures being used to steer various reception and/or transmission beams. In one embodiment, each grille 301 can be associated with a lens 302 disposed behind the grille 301 to assist with the definition of the reception and/or transmission beams. For example, a polycarbonate lens 302 can be disposed behind the grille 301 and configured as a compound Fresnel lens with a predetermined number of slits, such as five or seven, to assist with the definition of the reception and/or transmission beams.

Figure 4:
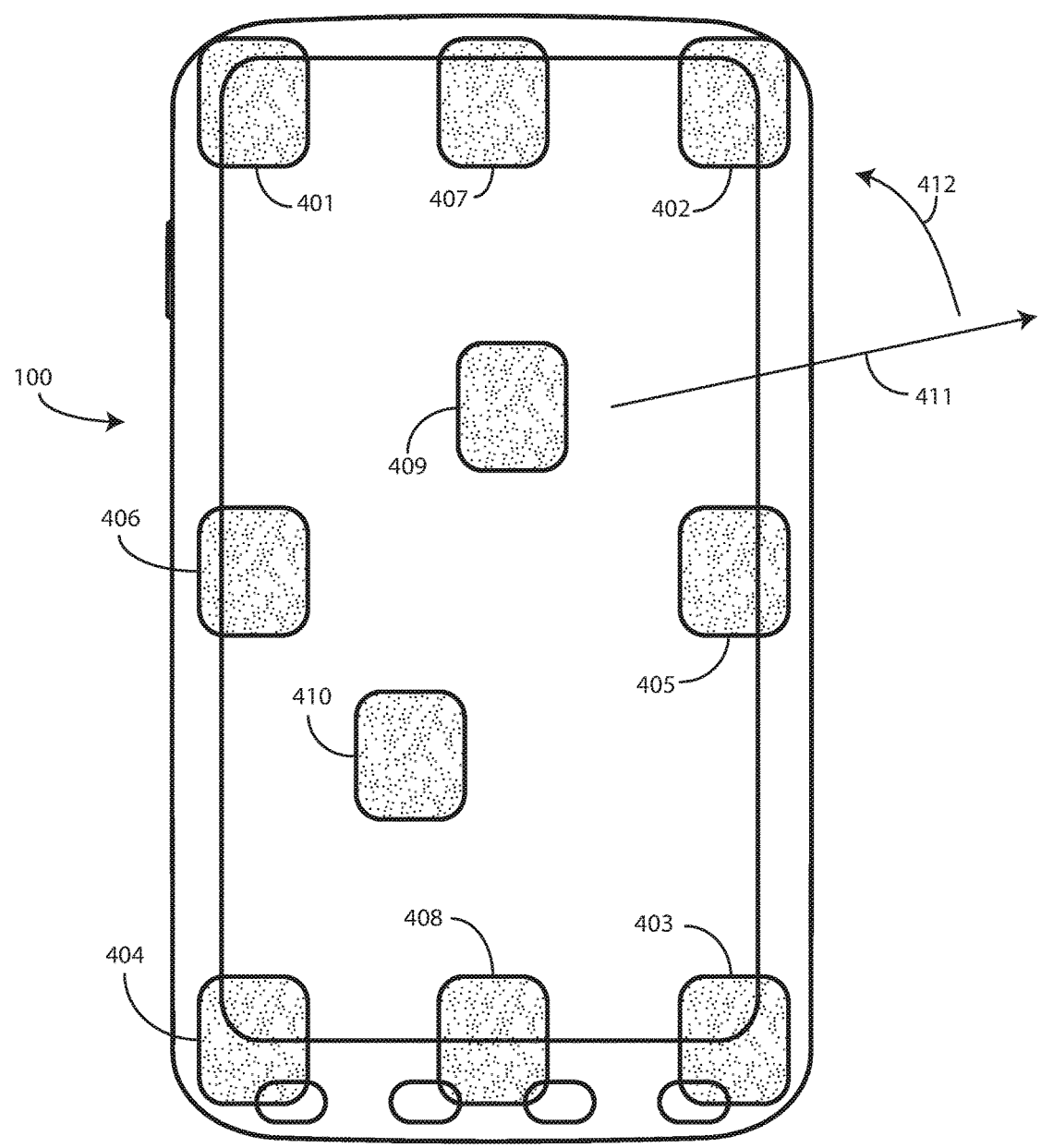
FIG. 4 illustrates explanatory locations along an electronic device where one or more proximity sensor components can be disposed in accordance with one or more embodiments of the disclosure.

It should be noted that corners 300 are not the only location at which proximity sensor and detector components can be located. Turning now to FIG. 4, illustrated therein are some of the many locations at which proximity sensor components, and optionally proximity detector components, may be located. These locations include corner locations 401,402,403,404, edge locations 405,406, end locations 407,408, major face locations 409, or ad hoc locations 410 based upon location. These locations can be used individually or in combination to achieve the desired detection radius 411 and radial detection sweep 412 about the electronic device 100. For example, some components can be disposed along the front major face of the electronic device 100, while other components are disposed on the rear major face of the electronic device 100, and so forth. Other locations and combinations will be obvious to those of ordinary skill in the art having the benefit of this disclosure.

Turning now back to FIG. 1, in one embodiment, the one or more processors 116 may generate commands based on information received from one or more proximity sensors 108. The one or more processors 116 may generate commands based upon information received from a combination of the one or more proximity sensors 108 and one or more other sensors 109. The one or more processors 116 may process the received information alone or in combination with other data, such as the information stored in the memory 118.

The one or more other sensors 109 may include a microphone, and a mechanical input component such as button or key selection sensors, touch pad sensor, touch screen sensor, capacitive sensor, and switch. Touch sensors may used to indicate whether the device is being touched at side edges, thus indicating whether or not certain orientations or movements are intentional by the user. The other sensors 109 can also include surface/housing capacitive sensors, audio sensors, and video sensors (such as a camera).

The other sensors 109 can also include motion detectors, such as accelerometers or gyroscopes. For example, an accelerometer may be embedded in the electronic circuitry of the electronic device 100 to show vertical orientation, constant tilt and/or whether the device is stationary.

Other components 110 operable with the one or more processors 116 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

In one or more embodiments, the electronic device 100 can be operated in multiple modes of operation. A first mode, referred to herein as the "default" mode of operation, occurs where the electronic device 100 is not actively being used by a user. Instead, when in the default mode of operation, in one embodiment the one or more processors 116 and other components 110 of the electronic device 100 can be placed in a low power or sleep mode while the one or more proximity sensor components 140 are active. In another embodiment, the one or more processors 116 cause at least the user interface 111 and/or display 102 to enter a low power or sleep mode when the infrared signal receiver of the one or more proximity sensor components 140 are not receiving the infrared emissions from external sources.

Once the one or more proximity sensor components 140 receive an infrared emission from an object external to the housing 101 of the electronic device 100, the one or more processors 116 of the electronic device 100 transition to an "active" mode of operation and are operable to actuate one or more user interface devices. In the active mode of operation, the one or more processors 116 are actively operating user interface devices such as the display 102, motion sensors, microphones, and so forth.

Thus, illustrating by example, when a user is not using the electronic device 100, the device—or at a minimum the user interface—may be in a sleep or low power mode in the default mode of operation. The one or more proximity sensor components 140 then actively monitor for the receipt of infrared emissions, which indicate that a user is within a reception radius of the one or more proximity sensor components 140. When infrared emissions are received from a source external to the housing 101 of the electronic device 100, the one or more processors 116 can detect this and can actuate one or more of the user interface components in anticipation of the user's next action. Accordingly, the user arrives at a device ready for action rather than having to pick the device up, wake it from the default mode, and wait for all systems to boot.

Figure 5:
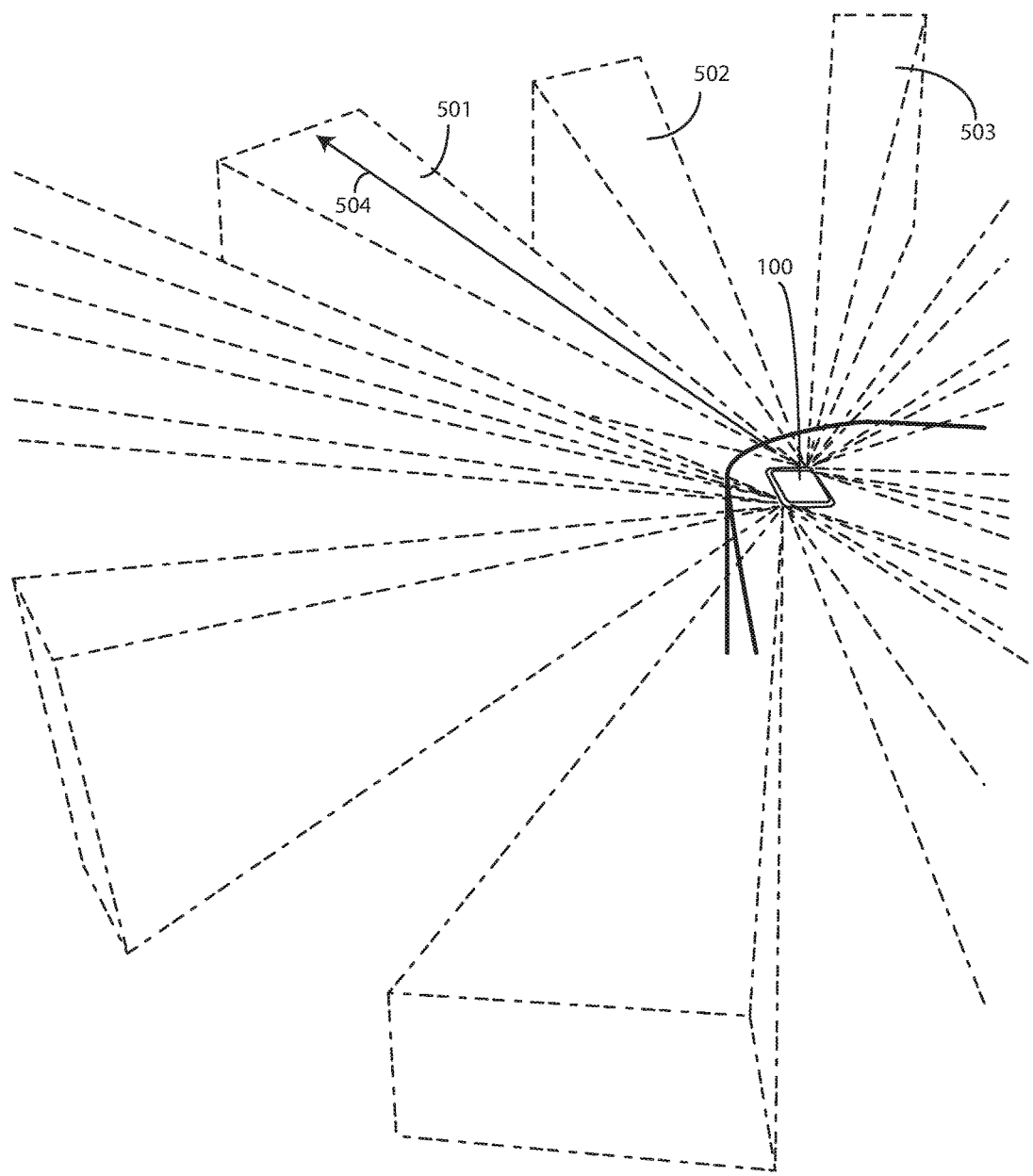
FIG. 5 illustrates an explanatory device having one or more proximity sensor components comprising infrared signal receivers in accordance with one or more embodiments of the disclosure.
Figure 6:
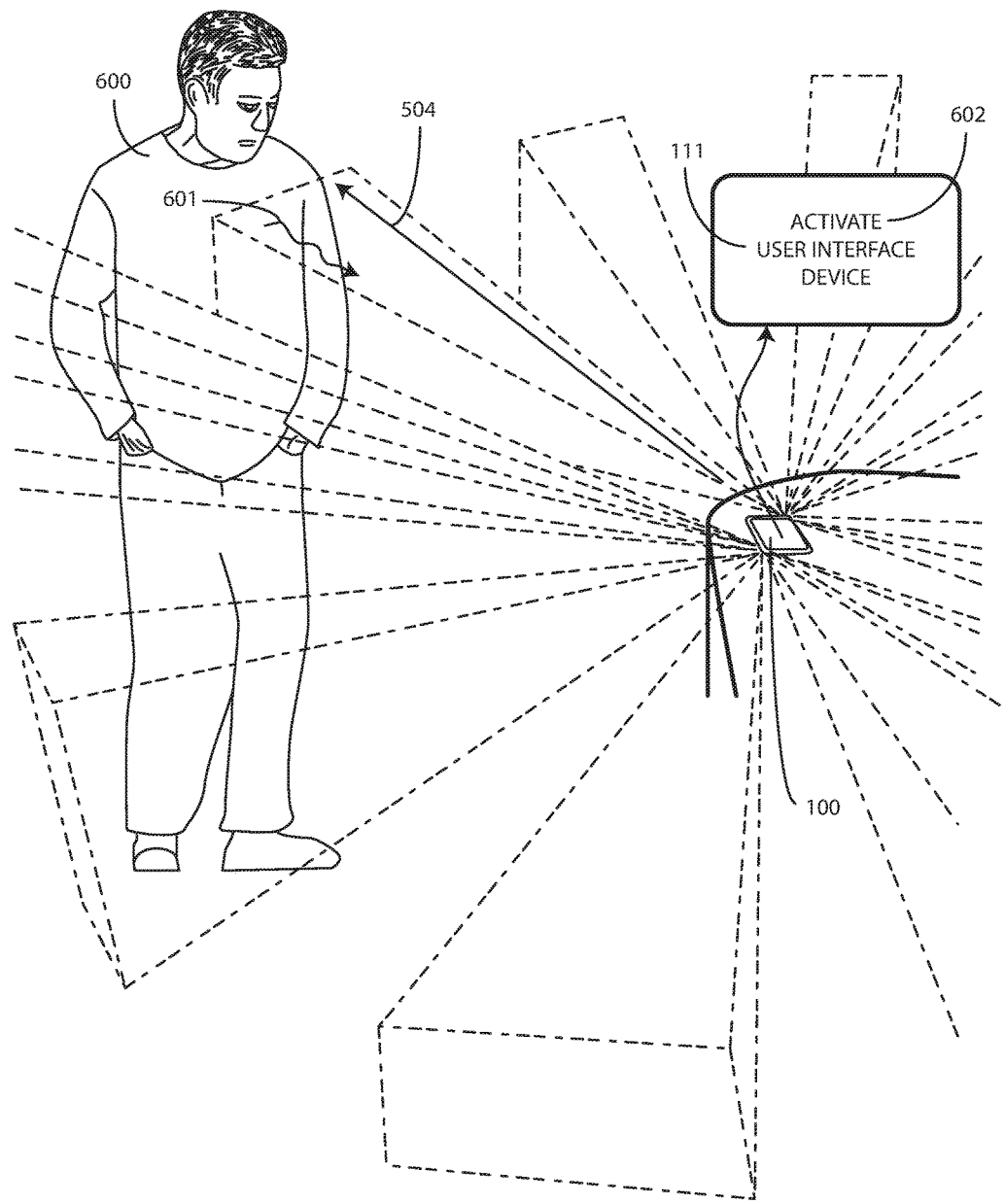
FIG. 6 illustrates the explanatory device of FIG. 5 receiving an infrared emission from an object external to the housing and executing one or more method steps, each in accordance with one or more embodiments of the disclosure.
Figure 7:
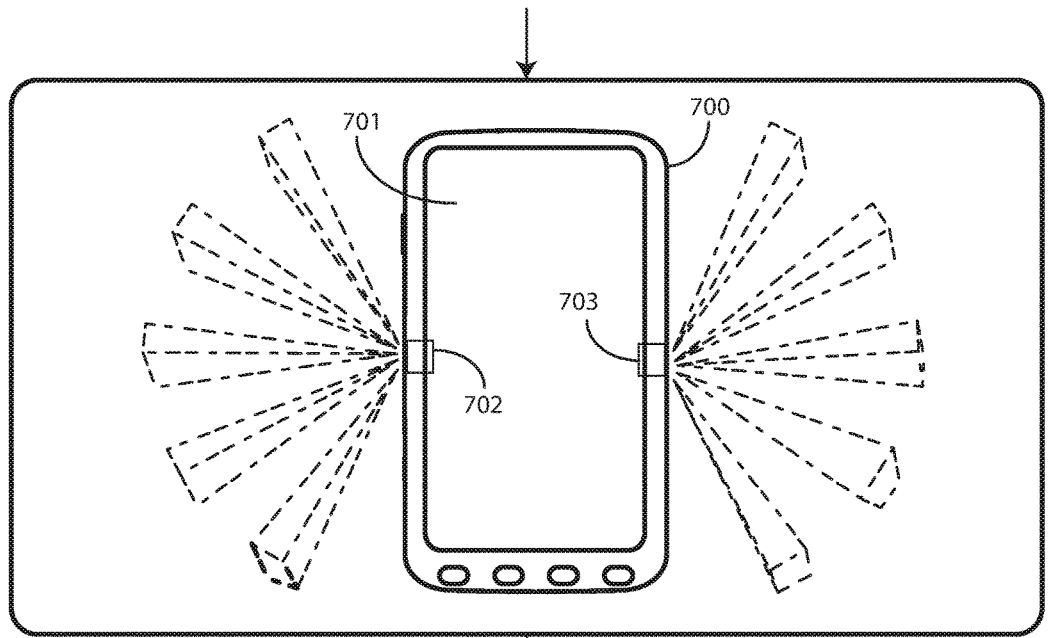
FIG. 7 illustrates one or more method steps in accordance with one or more embodiments of the disclosure.

This process is shown generally in FIGS. 5 and 6, with more detailed embodiments shown in FIGS. 7-12. Beginning with FIG. 5, the electronic device 100 is in the default mode of operation. Most components, including the display (102) and other sensors (109) and components (110) are in a low power or sleep mode. However, the one or more proximity sensor components 140 are in their active mode waiting to receive infrared emissions from an object external to the housing (101) of the electronic device 100. As shown in FIG. 5, one or more signal reception beams 501,502,503 can be defined within which infrared emissions are received as previously described above with reference to FIG. 3. In this embodiment, the signal reception beams 501,502,503 define a 360-degree reception area about the device with a reception radius 504 of about ten feet. As no user is within the reception radius 504, power consumption within the electronic device 100 can remain extremely low.

Turning now to FIG. 6, a user 600 enters the reception radius 504. The user's body heat results in an infrared emission 601 being delivered to the one or more proximity sensor components (140) of the electronic device 100. When this occurs, in one embodiment the one or more processors (116) are operable to actuate one or more user interface devices 111.

In one embodiment, the one or more user interface devices 111 comprise a microphone. Accordingly, the user 600 can begin to deliver voice commands to the microphone to control the electronic device 100. In another embodiment, the one or more user interface devices 111 comprise a motion detector such as an accelerometer or gyroscope. Thus, these components can be active to detect motion of the electronic device 100 when the user 600 picks it up. In yet another embodiment, the one or more user interface devices 111 can include the microphone and the accelerometer such that the user 600 can either pick up the electronic device 100 or deliver voice commands once inside the reception radius 504. Other user interface devices 111, or combinations thereof, will be obvious to those of ordinary skill in the art having the benefit of this disclosure.

Turning now to FIGS. 7-12, a more detailed description of embodiments of the disclosure is shown. Beginning with FIG. 7, an electronic device 700 having a user interface 701 and two proximity sensor components 702,703 disposed along either side is in a default mode of operation where the proximity sensor components 702,703 are active but the user interface 701, and optionally one or more processors operable with the user interface 701, is in a low power or sleep mode. Said differently, the one or more processors can operate the proximity sensor components 702,703 while the user interface 701 is in a low power or sleep mode in one embodiment. The proximity sensor components 702,703, which are low power devices, actively monitor for infrared emissions from objects exterior to the housing of the electronic device 700.

Figure 8:
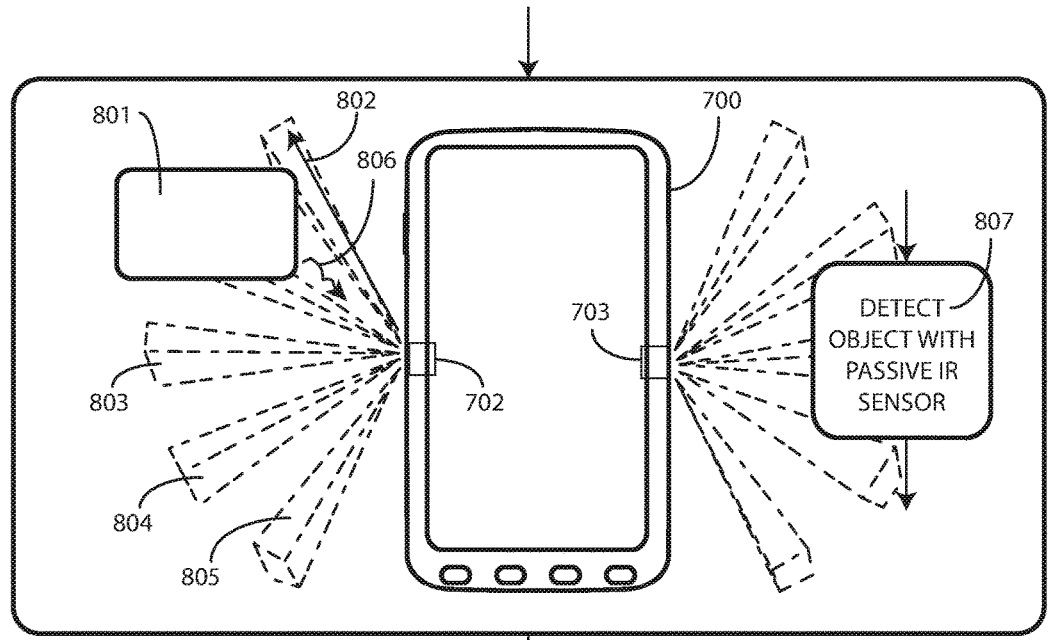
FIG. 8 illustrates one or more method steps in accordance with one or more embodiments of the disclosure.

Turning to FIG. 8, an object 801 external to the electronic device 700 has entered a reception radius 802 defined by one or more reception beams 803,804,805 of the proximity sensor components 702,703. The object 801 delivers an infrared emission 806 to one or more of the proximity sensor components 702,703. Circuitry operable with the proximity sensor components 702,703 detects 807 the presence of the object 801 and alerts the one or more processors of the electronic device 700. In one embodiment, this includes bringing the one or more processors into an active mode from a default mode.

Figure 9:
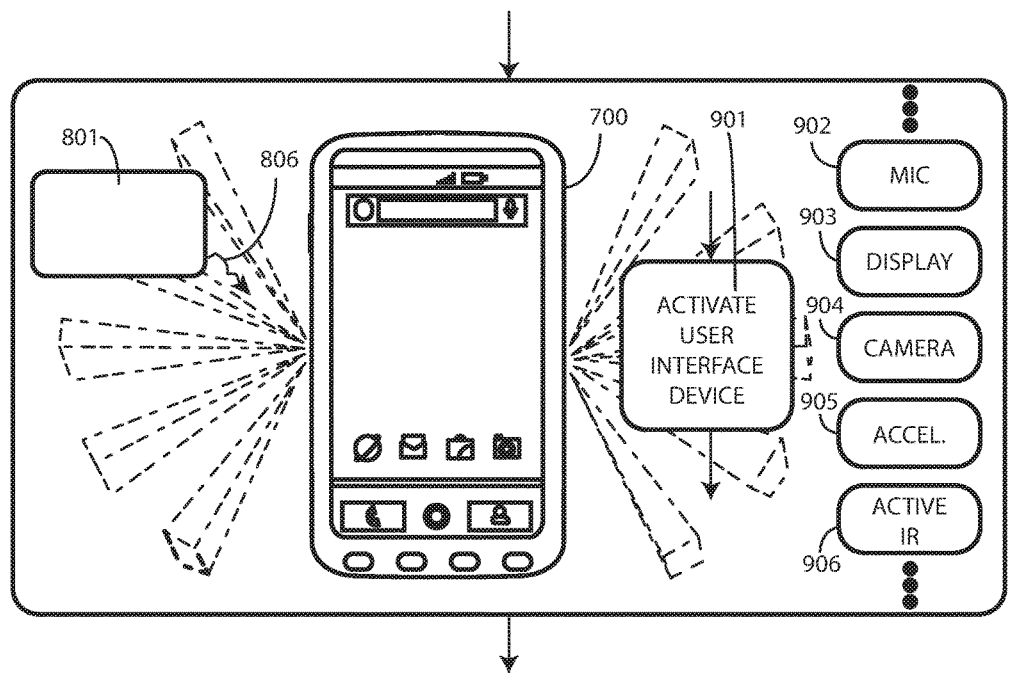
FIG. 9 illustrates one or more method steps in accordance with one or more embodiments of the disclosure.

Turning now to FIG. 9, the one or more processors are then operable to actuate 901 one or more user interface devices when the proximity sensor components 702,703 receive the infrared emission 806 from the object 801 external to the housing of the electronic device 700. The user interface components can be any of a number of interface components as shown in FIG. 9. These components can be actuated alone or in combination.

For example, in one embodiment the user interface devices comprise a microphone 902. In another embodiment, the user interface devices comprise a display 903. In another embodiment, the user interface devices comprise a camera 904. In another embodiment, the user interface devices comprise a motion detector 905, such as an accelerometer or gyroscope. In another embodiment, the user interface devices comprise a proximity detector component 906 that includes a signal emitter and a corresponding signal receiver. Other user interface devices will be obvious to those of ordinary skill in the art having the benefit of this disclosure.

Figure 10:
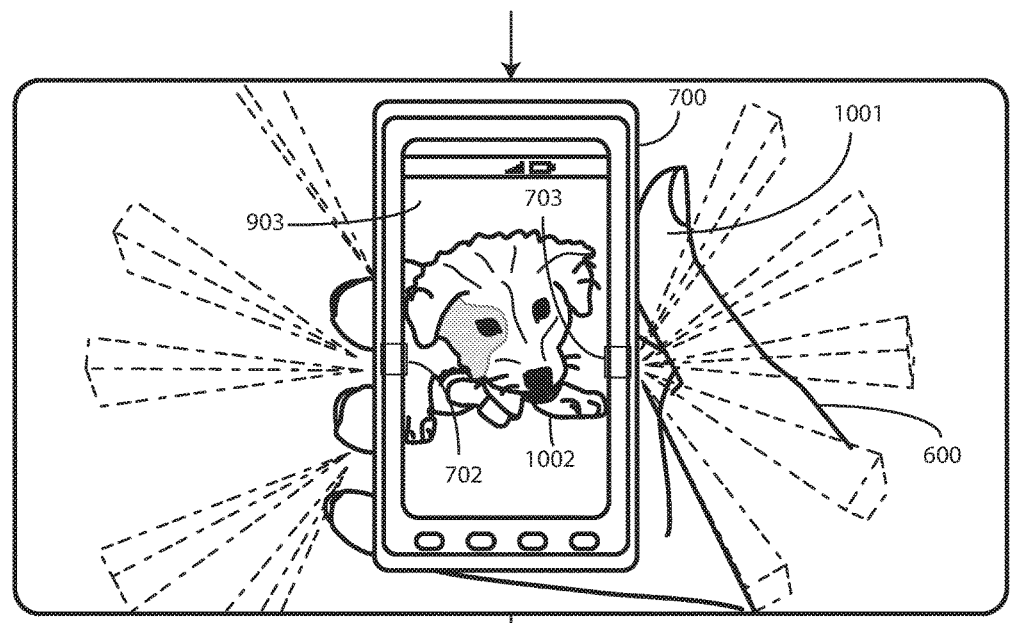
FIG. 10 illustrates one or more method steps in accordance with one or more embodiments of the disclosure.

In one embodiment, the goal of actuating the user interface devices is so that the electronic device 700 will be actively awaiting a user's next action and will not have to be manually pulled from the default mode of operation into the active mode of operation. Illustrating by example, if the object 801 is a person walking toward the electronic device 700, there is a positive probability that the person is coming to retrieve and/or use the electronic device 700. A user uses the electronic device 700 by interacting with a user interface. Accordingly, when the user is detected, certain user interface components can be automatically actuated so that they are ready for use when the user arrives. Thus, the microphone 902 and motion detector 905 may be actuated in combination to receive voice or motion input to bring the electronic device 700 fully into the active mode, as shown in FIG. 10 where the user 600 has picked up the electronic device 700 and the display 903 has been turned ON. If no user input is detected, as would be the case if the person passed by the electronic device 700, the user interface components can return to the default mode.

In one embodiment, when in the active mode as shown in FIG. 10, infrared emissions received from the hand of the user 600 by the one or more proximity sensor components 702,703 can be interpreted as user input. For example, the user 600 may slide his thumb 1001 along the side of the electronic device 700, thereby causing infrared emissions of differing intensities to be received at the one or more proximity sensor components 702,703. The one or more processors of the electronic device 700 can interpret this as user input to, for example, scroll pictures 1002 along the display. Other examples of functions the user 600 can control by delivering varying infrared emissions to the proximity sensor components include control of the volume of an audio output, control of the magnification of the image, control of the zoom level, and so forth. These are examples only, as other functions will be obvious to those of ordinary skill in the art having the benefit of this disclosure.

Embodiments of the disclosure contemplate that different user interface components will be suitable for different situations. For example, when the user first enters the reception radius (802), they may be able to easily deliver voice commands to the electronic device 700. However, they may not be able to easily see the display 903. In one or more embodiments, conservation of power within the electronic device 700 is a paramount goal. Accordingly, it would not make sense to turn on the display 903, which is a relatively high power consumption device, until necessary. It would make sense, by contrast, to turn on the microphone (902) when the user 600 is close enough to deliver voice commands.

Thus, in one or more embodiments of the disclosure, the one or more processors of the electronic device 700 are configured to prioritize each user interface device and to actuate the same as necessary. For example, the one or more processors may actuate a first user interface device when the object is a first distance from the housing, and actuate a second user interface device when the object is a second distance from the housing, the second distance less than the first distance. Illustrating by example, the one or more processors may actuate the microphone (902) and motion detector (905) when the user is a first distance from the electronic device 700, such as about ten feet. The one or more processors may then actuate the display 903 when the user is a second distance from the electronic device, such as about three feet. This prioritization and selective actuation is shown in FIGS. 11-12.

Figure 11:
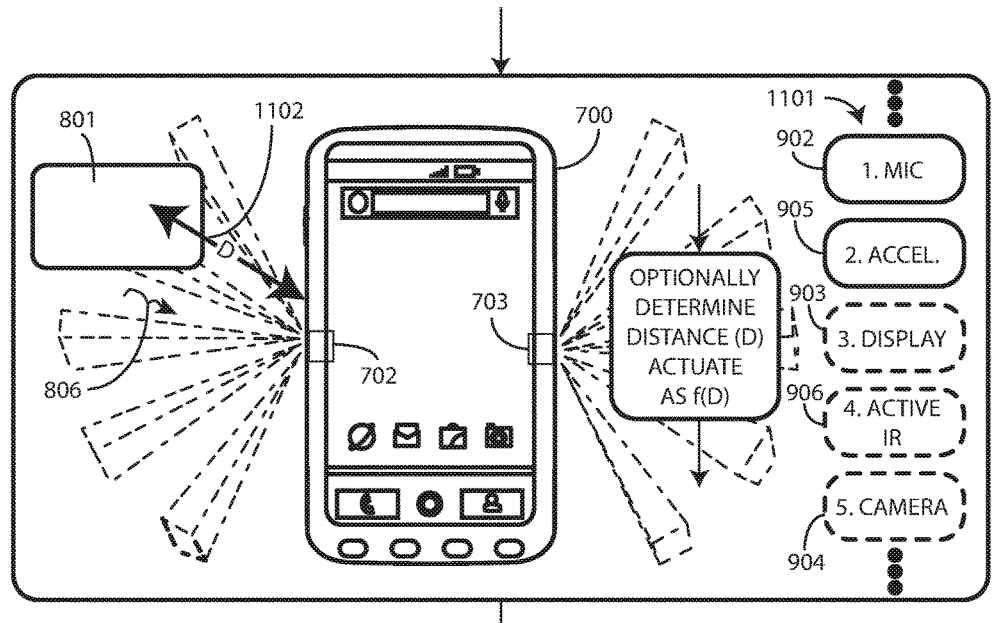
FIG. 11 illustrates one or more method steps in accordance with one or more embodiments of the disclosure.
Figure 12:
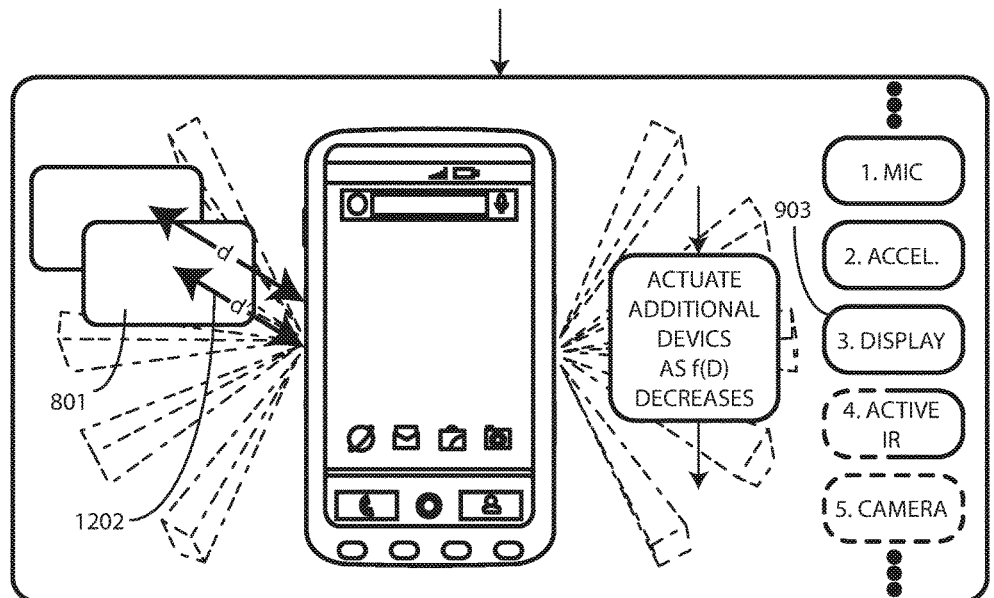
FIG. 12 illustrates one or more method steps in accordance with one or more embodiments of the disclosure.

Beginning with FIG. 11, the one or more processors of the electronic device 700 have prioritized the various user interface devices. Recall from FIG. 9 above that the unprioritized order of user interface devices was microphone 902, display 903, camera 904, motion detector 905, and proximity detector component 906. By contrast, in FIG. 11 the prioritized order of the user interface devices is microphone 902, motion detector 905, display 903, proximity detector component 906, and camera 904.

In one or more embodiments, the one or more processors actuate the various user interface devices in accordance with this prioritization 1101. As shown in FIG. 11, having received the infrared emission 806 from the object 801, the one or more processors have actuated a first user interface component, i.e., the microphone 902, and a second user interface component, i.e., the motion detector 905, while leaving the other user interface components in the low power or sleep mode.

In one embodiment, the one or more processors are operable to determine, with the proximity sensor components 702,703, a distance 1102 of the object 801 from the housing of the electronic device 700. For example, the proximity sensor components 702,703 will receive infrared emissions 806 having greater intensity or magnitude as the object 801 gets closer to the electronic device 700. A measurement of intensity can be correlated with distance. Accordingly, in one embodiment the one or more processors can actuate user interface devices as a function of the distance 1102.

Thus, the one or more processors might actuate the microphone 902 and motion detector 905 when the object 801 is a first distance from the electronic device 700, such as ten feet, while actuating other user interface devices such as the display 903 when the object 801 is a second distance from the electronic device that is less than the first distance. As shown in FIG. 12, when the object 801 moves to the second distance 1202, the one or more processors actuate a third user interface device, which in this embodiment is the display 903. This process can repeat, actuating each user interface device as a function of distance such that only those user interface components suitable for use at various distances are operable, thereby conserving power.

Figure 13:
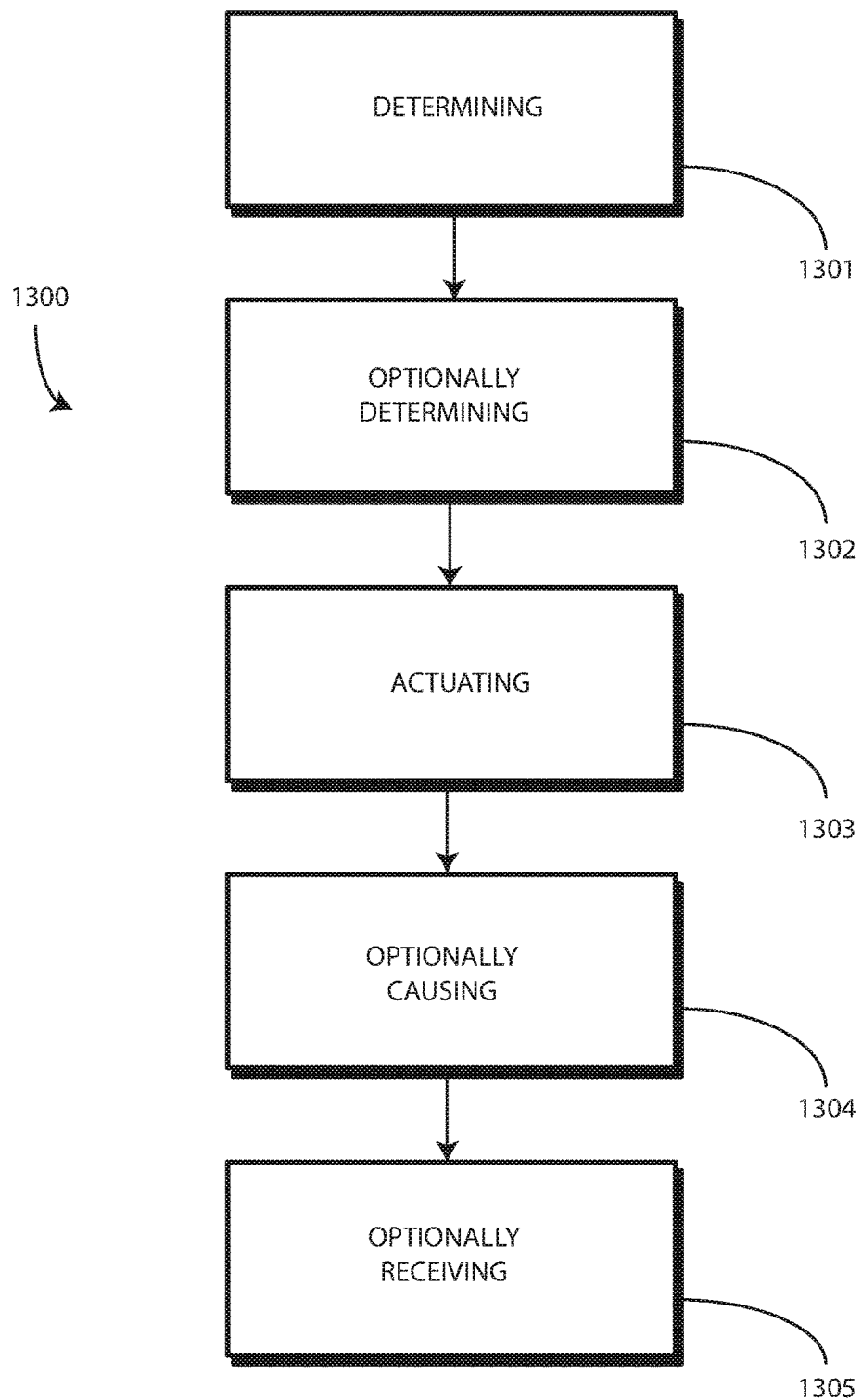
FIG. 13 illustrates one explanatory method in accordance with one or more embodiments of the disclosure.

Turning now to FIG. 13, illustrated therein is a method 1300 in accordance with one or more embodiments of the disclosure. At step 1301, the method 1300 includes determining, with at least one proximity sensor component comprising an infrared signal receiver to receive infrared emissions from objects external to a housing, a proximity of an object to a housing of a portable electronic device. At step 1303, in response to detecting the proximity of the object, the method 1300 includes actuating one or more user interface devices of the portable electronic device.

At optional step 1302, the method 1300 can include determining a distance of the object from the housing. Where this step 1302 is included, step 1303 can include actuating the user interface device as a function of the distance.

In one or more embodiments, the one or more user interface devices comprise a plurality of user interface devices. Where this is the case, step 1303 can include actuating some user interface devices before other user interface devices. For example, the some user interface devices can comprise one or more of an accelerator or a microphone, while the other user interface devices comprising one or more of a display or a touch sensor.

At optional step 1304, the method 1300 can include causing the one or more user interface devices to enter a low-power or sleep mode when the at least one proximity sensor component fails to detect the proximity of the object. At optional step 1305, the method can include receiving user input with the one or more user interface devices.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
   a housing;
   a user interface;
   one or more processors operable with the user interface;
   a plurality of user interface devices; and
   at least one proximity sensor component operable with the one or more processors and comprising an infrared signal receiver receiving an infrared emission from an object external to the housing;
   the one or more processors:
      prioritizing the plurality of user interface devices;
      actuating a first user interface device after the infrared signal receiver receives the infrared emission from the object and when the object is a first distance from the housing; and
      actuating a second user interface device when the object is a second distance from the housing, the second distance less than the first distance.

2. The electronic device of claim 1, the plurality of user interface devices comprising a motion detector.

3. The electronic device of claim 2, the one or more processors actuating the motion detector by transitioning the motion detector from a low power or sleep mode to an active mode of operation.

4. The electronic device of claim 3, the one or more processors actuating only the motion detector after the infrared signal receiver receives the infrared emission from the object.

5. The electronic device of claim 1, the plurality of user interface devices further comprising a microphone.

6. The electronic device of claim 1, wherein the at least one proximity sensor component and associated circuitry of the at least one proximity sensor component comprise the only sensor device operating in an active mode prior to the infrared signal receiver receiving the infrared emission from the object.

7. The electronic device of claim 1, the one or more processors further determining, with the at least one proximity sensor component, a distance of the object from the housing, the one or more processors actuating one or more user interface devices as a function of the distance.

8. The electronic device of claim 1, the first distance being about ten feet.

9. The electronic device of claim 1, the first user interface device comprising an accelerometer, the second user interface device comprising a display.

10. The electronic device of claim 1, the one or more processors actuating a third user interface device when the object is a third distance from the housing, the third distance less than the second distance.

11. The electronic device of claim 10, the first user interface device comprising one or more of an accelerometer or a microphone, the third user interface device comprising a display.

12. The electronic device of claim 1, the one or more processors causing the one or more processors and the user interface to enter a low power or sleep mode when the infrared signal receiver is not receiving the infrared emission.

13. The electronic device of claim 12, the at least one proximity sensor component remaining operational while the one or more processors and the user interface is in the low power or sleep mode.

14. A method in an electronic device, the method comprising:
   determining, with at least one proximity sensor component comprising an infrared signal receiver to receive an infrared emission from an object external to a housing, a proximity of the object to the electronic device; and
   in response to detecting the proximity of the object, transitioning one or more user interface devices of the electronic device from a low-power or sleep mode to an active mode of operation;
   the one or more user interface devices comprising a plurality of user interface devices, the method further comprising actuating some user interface devices before other user interface devices.

15. The method of claim 14, the method further comprising determining a distance of the object to the electronic device.

16. The method of claim 15, the transitioning occurring as a function of the distance.

17. The method of claim 14, the some user interface devices comprising one or more of an accelerator or a microphone, the other user interface devices comprising one or more of a display or a touch sensor.

18. The method of claim 14, further comprising causing the one or more user interface devices to enter a low power or sleep mode when the at least one proximity sensor component fails to detect the proximity of the object.

\* \* \* \* \*